J. BURGUM.
Device for Keeping Meat under Brine.
No. 55,463. Patented June 12, 1866.
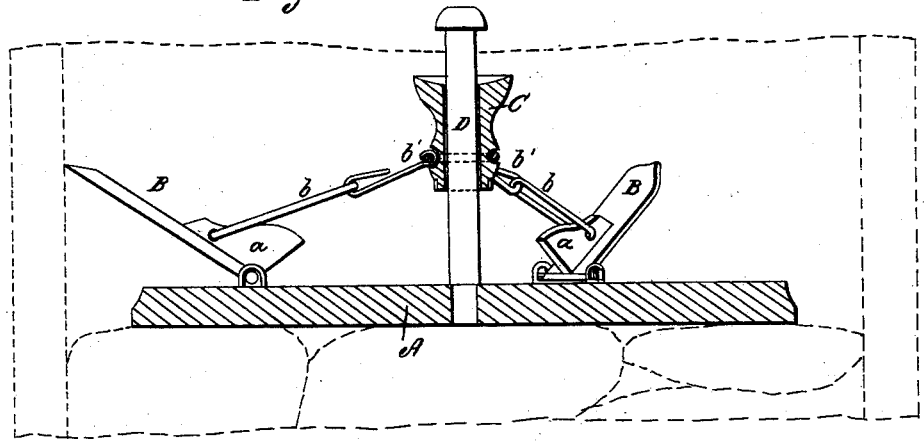
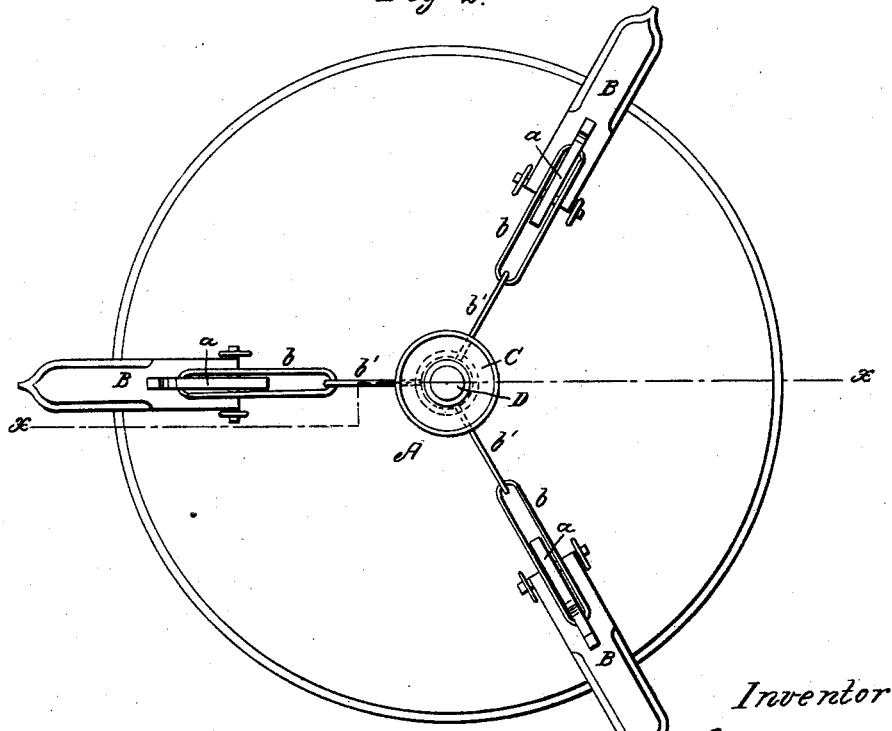
Witnesses:
Inventor:

UNITED STATES PATENT OFFICE.

JOHN BURGUM, OF CONCORD, NEW HAMPSHIRE.

IMPROVED DEVICE FOR KEEPING MEAT UNDER BRINE.

Specification forming part of Letters Patent No. 55,463, dated June 12, 1866.

*To all whom it may concern:*

Be it known that I, JOHN BURGUM, of Concord, in the county of Merrimack and State of New Hampshire, have invented a new and Improved Device for Keeping Meats, &c., under Brine; and I do hereby declare that the following is a full, clear, and exact description thereof, which will enable others skilled in the art to make and use the same, reference being had to the accompanying drawings, forming part of this specification, in which—

Figure 1 is a transverse section of my invention, taken on the plane of the line $x$ $x$, Fig. 2. Fig. 2 is a plan or top view of the same.

Similar letters of reference indicate like parts.

My invention relates to an apparatus or device for keeping pork, beef, and other salted or pickled meats, as well as fish, under brine while in barrels, firkins, or the like.

The method heretofore usually adopted for accomplishing this is to lay a board or the like on the top of the meat in the brine and and place a large stone or other weight upon the board. The disadvantages resulting from this practice are, first, the stone or weight is likely to roll off into the brine, when the board will be released and the meat get above the brine, to say nothing of the disagreeable work of recovering the stone or weight out of the brine; second, much trouble is necessary in order to raise the stone or weight and the board out of the barrel, so that access may be had to the meat; third, the operation can in no case be performed without getting more or less brine upon the hands.

My invention consists in providing a circular or any other proper shaped platform with a series of dogs, or their equivalents, so arranged and operating that the platform may be thrust down, so as to place meat below the brine, and there held by the dogs catching against the sides of the barrel, a proper means for liberating them being provided.

A designates the platform or disk, which is made of a size which will permit of its being placed within the barrel so as to ride upon the meat therein contained.

B B B are the dogs. These are pivoted at proper distances apart to the upper side of the disk A, their motion being outward toward the sides of the barrel and inward toward the center of the disk. Their points are sharpened, so as to the better catch into the sides of the barrel. Upon the upper side of each dog there is a projection, $a$, into which is fastened a link, $b$, to which hooks $b'$ are attached, whose other ends are fastened to a collar or slide, C, which encircles a standard or handle, D, which runs up from the center of the platform or disk.

When it is desired to use this apparatus it is placed inside the barrel so that the under side of the platform or disk will rest on the meat in the barrel; then by depressing this disk, so as to crowd down the meat below the brine, which can be done by pressing upon the handle D, the dogs are then allowed to fall against the sides of the barrel. Now, on releasing the presure upon the disk A, the dogs will catch into the sides of the barrel and hold the disk in the desired position. The apparatus is easily removed from the barrel when access to the meat is desired by slightly pressing down upon the handle D and drawing up the collar C, which entirely releases the dogs and therefore permits the ready removal of the apparatus.

I do not limit myself to the particular construction or arrangement of the dogs as herein described.

What I claim as new, and desire to secure by Letters Patent, is—

1. The platform or disk A, provided with dogs B, or their equivalent, constructed and arranged so as to operate substantially in the manner specified.

2. The combination of the dogs B, platform A, collar C, and connecting-links $b$ and $b'$, or their equivalent, substantially as herein specified.

JOHN BURGUM.

Witnesses:
FRANCIS WOODBRIDGE,
S. L. OTIS.